Oct. 12, 1926.
J. S. ULLOM
1,602,629
BABY WALKER
Filed April 22, 1924
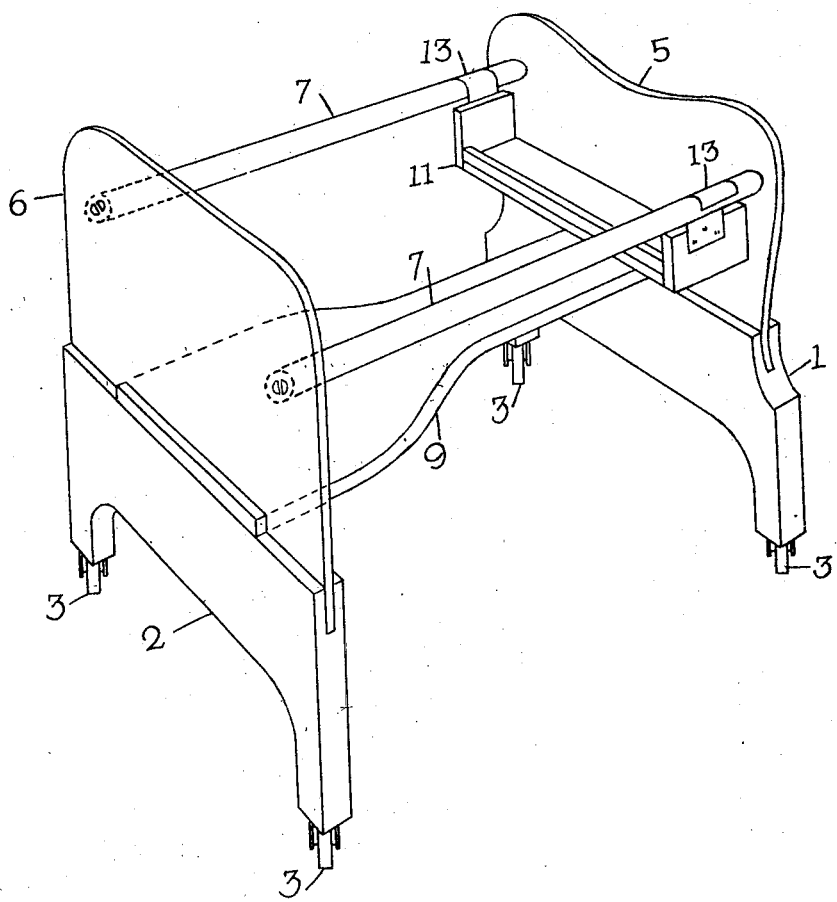
INVENTOR
John S. Ullom
BY Allen Ullom
ATTORNEYS Patented Oct. 12, 1926.

1,602,629

UNITED STATES PATENT OFFICE.

JOHN S. ULLOM, OF CINCINNATI, OHIO.

BABY WALKER.

Application filed April 22, 1924. Serial No. 708,283.

My invention relates to baby walkers, in which a baby can find adequate support while his feet are on the ground, and which will not tip over.

There are now on the market several four wheel structures of the type having a saddle on which a baby is seated and some kind of a ring which surrounds his body. The wheels are in some of the cases, caster wheels, which in theory will permit the device to be pushed in any direction without tipping over.

It is a defect of these devices that floors are often encumbered with rugs, carpet edges and the like, which catch a caster and prevent its turning, and a strong baby can overturn any of the devices which have come to my attention, in spite of the fact that their specific purpose is to avoid this danger.

It is the object of my invention to provide against any chances of the baby tipping over the device, and I thus depart widely from the designs hitherto in vogue, for vehicles of this specific character, and in the nature of the support for the baby, construction fore and aft, and in various details, provide for greater security, safety, and inexpensiveness of construction, consistent with adequate strength.

I accomplish my objects by that certain construction and arrangement of parts to be hereinafter more specifically pointed out and claimed.

In the drawing the figure is a perspective view of the device.

In the illustrated form, which I show for purposes of illustration of the points of my invention, as said points are set forth in the appended claim, I show a front truck 1, and rear truck 2, said trucks having legs in which are set, as in a piece of furniture, the caster wheels 3. All caster wheels are revoluble in their sockets, as in normal caster construction.

The trucks may be in the form of unitary boards, but we do not wish to be confined to this specific design, as light tubular rods may also be employed.

Extending lengthwise and connecting foot and head, bracing the front and back, pieces 5 and 6 which extend upwardly from the trucks 1 and 2 are bars 7 which may be rods of wood or light tubular metal. These rods not only serve to brace the structure, but also serve as supports for the baby and consequently are of sufficient height to prevent the baby from falling over them.

The saddle board 9 may be held by bolts if the structure be of metal, or wood screws if the structure be of wood, and also serves as a brace for the foot and head supports, front and back.

As far as I know, and I believe it is new in the art, is the application of a tray 11 which not only can be used for toys to amuse the child, but also can be used as a food tray. This tray is removable for cleansing as it simply rests upon the bars 7 by hook plates 13.

This device cannot be tipped either forward or backward which is due to the height of the front and back supports and likewise to the fact that the child would have the center of gravity of the device working against him, even though he moves near enough to the front and back supports and would press on them directly. You cannot tip the device over sidewise because of bars 7 holding the child against tipping sidewise and normally his position astraddle of the board will not give him purchase for a sidewise tipping mood.

Because of the wheels and their flexibility to move in any direction, the child is enabled to direct this device to any point that it may desire to approach.

I have experimented on this device before applying for a patent and have definitely found that it was practically impossible for any child incapable of walking, to unbalance itself in this vehicle.

While I have shown in the drawing what may be called a tentative sketch of the device I had in mind, I do not wish to be limited to the exact construction. It is possible that I may use wood in the structure, light tubular bars or small metal rods.

Having thus described my invention, what

I claim as new and desire to secure by Letters Patent, is:—

A baby walker comprising a front and rear truck with caster wheels revoluble in sockets supporting said trucks, front and back boards mounted on said trucks, rods extending lengthwise of said baby walker bracing said front and back boards adapted to confine a baby within said walker, and a saddle board extending longitudinally across said walker intermediate the rods bracing said front and back boards.

JOHN S. ULLOM.